WRAPPING PAPER SUPPLY DEVICE FOR COIN PACKING MACHINE

Original Filed Feb. 6, 1968 2 Sheets-Sheet 1

INVENTOR
Yoshihiro Hatanaka et. al.
BY
Albert, Downing & Seibold
Attorneys

United States Patent Office

Re. 27,987
Reissued Apr. 23, 1974

27,987

WRAPPING PAPER SUPPLY DEVICE FOR COIN PACKING MACHINE

Yoshihiro Hatanaka, Masaru Itoda, and Chiaki Ono, Himeji, Japan, assignors to Glory Kogyo Kabushiki Kaisha, Shimoteno, Himeji-shi, Hyogo-ken, Japan Original No. 3,546,850, dated Dec. 15, 1970, Ser. No. 703,431, Feb. 6, 1968. Application for reissue Oct. 16, 1972, Ser. No. 297,694
Claims priority, application Japan, Feb. 9, 1967, 42/8,583; Feb. 9, 1967 (utility model), 42/11,125
Int. Cl. B65b *41/16*
U.S. Cl. 53—389 10 Claims

Matter enclosed in heavy brackets [ ] appears in the original patent but forms no part of this reissue specification; matter printed in italics indicates the additions made by reissue.

ABSTRACT OF THE DISCLOSURE

In a coin packing machine wherein a stack of a predetermined number of coins is packed by wrapping a wrapping paper around the stack, a number of coils of wrapping papers of different types are mounted on a rotary disc, and when a particular type of the coin to be packed is selected, the coil of the wrapping paper corresponding to the selected type is brought to the operating position.

BACKGROUND OF THE INVENTION

This invention relates to a wrapping paper supply device for automatic coin packing machines.

*PRIOR ART*

In a well known coin packing machine, coins are successively stacked flatwisely to form a cylindrical stack. Upon reaching a predetermined number, the stacking of coins is stopped, a length of wrapping paper having a width slightly larger than the height of the stack is wrapped around the stack, and then opposite ends of the wrapped paper are folded to securely hold the packed coins. The surface of the wrapping paper is printed with words representing the number and type of the coins contained in the package. In addition, the width of the wrapping paper should be varied in accordance with the type of the coin to be packed. For this reason, where various types of coins are to be packed by the same packing machine, it is necessary to prepare various types of wrapping papers corresponding to the types of the coins. In prior automatic coin packing machines, whenever the operation of the machine is switched from one to another type of coin it is necessary to mount a particular type of wrapping paper corresponding to the selected type of coin.

This is of course troublesome and decreases the operating speed of the packing machine.

SUMMARY OF THE INVENTION

It is therefore an object of this invention to provide an improved wrapping paper supply device for an automatic coin packing machine by means of which, whenever the operation of the packing machine is switched from one to another type of coin, a particular type of wrapping paper corresponding to the selected type of coin is automatically brought to the operating position.

Briefly stated, according to a preferred embodiment of this invention a rotary disc is provided to hold a plurality of coils of wrapping papers of different types in circumferentially spaced apart relationship. A motor for turning the rotary disc is provided to be energized in response to the coin type selecting operation of the automatic coin packing machine to bring a particular coil of the wrapping paper corresponding to the selected type of coin to the operating position. Further, a locking device is provided to lock the rotary disc in the selected position.

BRIEF DESCRIPTION OF THE DRAWING

The invention can be more fully understood from the following description taken in connection with the accompaying drawing in which.

DESCRIPTION OF THE PREFERRED EMBODIMENTS

Figure 1:
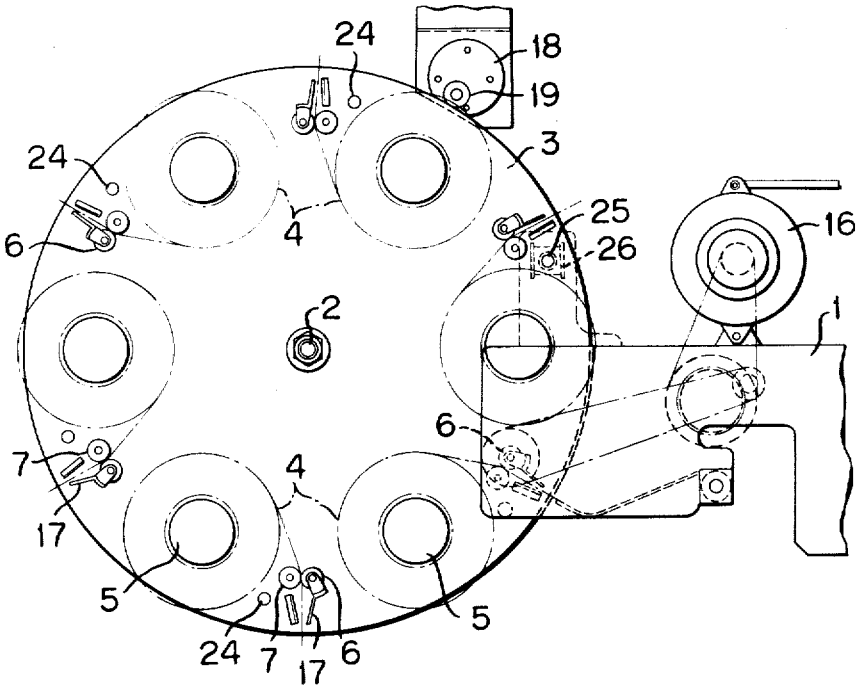
FIG. 1 is a top plan view of the novel wrapping paper supply device.
Figure 2:
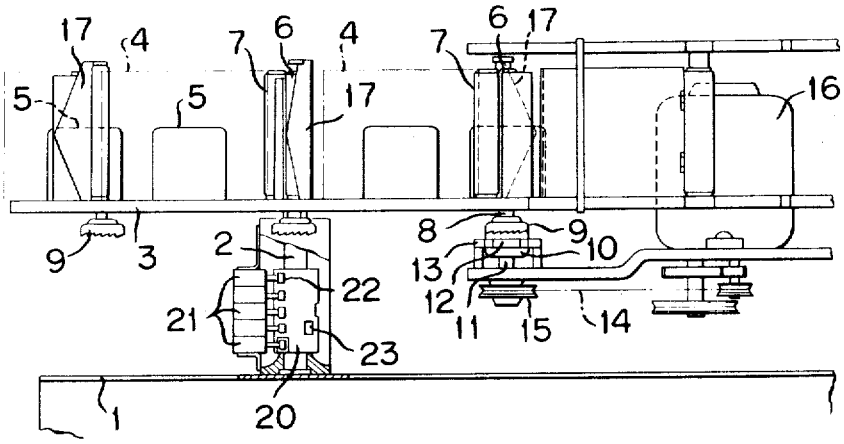
FIG. 2 is a side elevational view of the device shown in FIG. 1.

Referring now to the accompanying drawing, the novel wrapping paper supply device for coin packing machines comprises a horizontal rotary disc 3 supported by a vertical shaft 2 rotatably journalled by a stationary machine frame 1 and a plurality of cylindrical holders 5 secured to the upper surface of rotary disc 3 to support rolls of webs of wrapping papers 4 having different widths and printed words dependent upon the type of the coin to be packed, said holders 5 being uniformly spaced along a circle on rotary disc 3. At one side of each roll 5 are provided a vertical driving roller 6 and a pinch roller 7. As shown in FIG. 2, the lower end of the driving shaft 8 of each driving roller 6 is projected beyond the lower surface of rotary disc 3, wherein a serrated clutch member 9 is mounted on driving shaft 8. Another serrated clutch member 10 adapted to selectively cooperate with one of said clutch members 9 is mounted on a shaft 11 by means of a pin and slot connection (not shown) to be movable in the axial direction of shaft 11 which is rotatably journalled on machine frame 1.

Clutch member 10 is provided with an annnular groove 12 on its periphery to receive a lever 13 actuated by an electromagnet, not shown. Shaft 11 is driven by an electric motor 16 through a belt 14 and a pulley 15.

On one side of each of driving rollers 6 and on the upper surface of rotary disc 3, there is provided a cutting knife 17 having a V-shaped cutting edge directed toward driving roller 6. The rotary disc 3 is driven by an electric motor 18 through a driving roller 19 in contact with the peripheral surface thereof.

A switch operating cam 20 is mounted on driving shaft 2 of rotary disc 3 to operate actuating member 22 of respective switches 21 corresponding to the type of coins or type or width of the wrapping paper 4.

Figure 3:
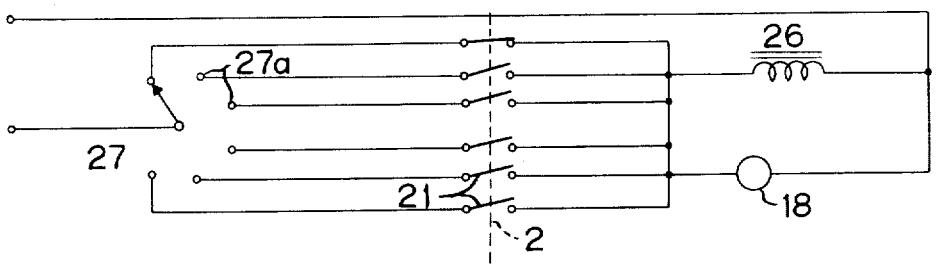
FIG. 3 shows an electric circuit diagram utilized in the device shown in FIGS. 1 and 2.

Cam 20 is provided with a plurality of offset portions 23 adapted to engage respective actuating members 22 of respective switches 21 to actuate the same. Switches 21 are connected in parallel, as shown in FIG. 3, and are respectively connected in series with an electromagnet or solenoid 26 arranged to operate a locking bar 25 adapted to selectively engage one of spaced openings 24 through rotary disc 3, each one of said openings being provided for each type of coin. Switches 21 are also connected in series with driving motor 18 of rotary disc 3.

The operation of the wrapping paper supply device embodying this invention is as follows:

In operating a coin packing machine, not shown, the machine is set for a particular type of coin by operating a selector knob. Responsive to this operation, an operating shaft (not shown) is rotated to adjust the width of a coin passage, which successively sends out a counted number of coils selected to a packing mechanism, to a value corresponding to the diameter of the selected coin. Further, in response to the rotation of said operating shaft the position of edge folding levers (not shown) is adjusted to generally correspond to the height of a stack of a predetermined number of the coins selected, said levers acting to fold opposite edges of the wrapping paper that has been wrapped around the stack of coins. Since the above described operation of the coin packing machine and the constructions thereof are well known in the art, further description thereof seems unnecessary.

A rotary switch 27, shown in FIG. 3, is arranged to be rotated in response to the rotation of said operating shaft of the packing machine. Stationary contacts 27*a* of rotary switch 27 are respectively connected to switches 21 so that motor 18 and electromagnet 26 are energized through one of the switches 21 corresponding to the selected type of coin. Then locking bar 25 is withdrawn from opening 24 of rotary disc 3, while at the same time the rotary disc is rotated by motor 18 through a driving roller 19. Although not shown in the drawing, switches 21 may also be connected to light pilot lamps that indicate the type of coin selected. As rotary disc 3 rotates, its shaft 2 will rotate cam 20 to sequentially operate switches 21. When a particular switch 21 that has been selected in accordance with the selected type of coin to energize motor 18, and electromagnet 26 is opened by a corresponding actuating portion 23 of cam 20, motor 18 and electromagnet 26 are deenergized to cause locking bar 25 to engage a selected one of openings 24, thus stopping the rotation of rotary disc 3. Then a particular coil of the wrapping paper corresponding to the selected type of coin will be positioned close to a packing mechanism (not shown).

When a predetermined number of counted and successively supplied and piled up coins are in the packing mechanism of the machine, an electromagnet (not shown) is operated to attract lever 13 received in annular groove 12 of clutch member 10 to move it upwardly to engage clutch member 9. Since clutch member 10 is normally driven by electric motor 16, coupling between clutch members 9 and 10 causes a driving roller 6 for a particular wrapping paper 4 for the selected type of coin to be driven. Thus, the driving roller 6 cooperates with pinch roller 7 to supply the web of wrapping paper 4 to the periphery of the stacked coins. At the moment when wrapping paper 4 is wrapped around the stack of coins, a tension is abruptly applied to the wrapping paper so that the paper will be cut into a predetermined length by cutting knife 17. After a predetermined length of wrapping paper 4 is sent out, motor 16 is stopped. Upper and lower edges of the paper wrapped around the stacked coins in the form of a cylinder are folded by said folding levers, thus completing the packing operation.

In the manner, in response to the selection of the type of the coins to be packed, rotary switch 27 is operated to connect one of the switches 21 corresponding to the selected type to one side of an electric source, and when this switch is closed, motor 18 and electromagnet 26 are energized to operate locking bar 25 and motor 18, whereby rotary disc 3 is rotated to bring a particular coil of wrapping paper 4 supported thereon and corresponding to the selected type of coin to the operating position in which the paper is supplied to the packing mechanism as above described. Concurrently therewith, clutch members 9 and 10 are coupled together to supply the selected wrapping paper to the packing mechanism.

Figure 4:
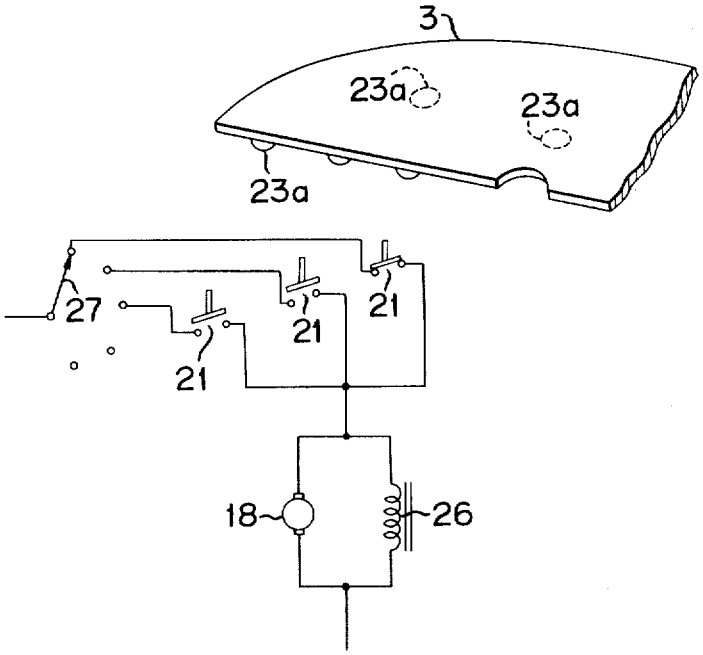
FIG. 4 shows a modified switch operating arrangement.

FIG. 4 shows a modified arrangement for operating switches 21. In this modification, instead of cam 20 mounted on the shaft 2 of the rotary disc 3, a plurality of switch actuators 23a, in the form of round-head screws, for example, are secured on the lower surface of rotary disc 3 at different radial distances from the axis of rotation thereof. In the condition shown in FIG. 4, right hand switch 21, is held closed to energize electromagnet or solenoid 26 and disc driving motor 18. However, when rotary disc 3 rotates to a position to bring the selected coil of the wrapping paper to the operating position, said switch 21 will be opened by the cooperating switch actuator 23a to deenergize motor 18 and electromagnet 26.

Thus, according to this invention, whenever the coin packing mechanism is operated to select any desired type of coin, a wrapping paper suitable for said selected type is automatically selected and fed to the packing mechanism, thus improving the packing efficiency as compared with the conventional packing machine wherein each time the type of the coins is changed from one to another, it was necessary to select a coil of wrapping paper suitable for the selected type and to mount said coil on the packing machine. Further, the positioning of the rotary disc supporting coils of wrapping papers can be effected accurately by the rotary disc driving motor controlled by a rotary switch responsive to the selection of the type of coin and a plurality of switches arranged to be selectively operated according to the rotation of the rotary disc. Thus, the selected coil of the wrapping paper supported on the rotary disc is automatically brought into the operating position and is then positively supplied to the packing mechanism by the driving roll, which is driven through a coupling clutch.

While in the foregoing embodiments, the rotary disc adapted to support coils of wrapping papers was shown as a horizontal rotary disc, it will be apparent that the rotary disc may be installed in a vertical or inclined position with respect to the packing mechanism. Alternatively, a reciprocating wrapping paper holder may be substituted for the rotary disc.

While in the foregoing description the invention has been shown and described in terms of preferred embodiments, it will be clear to one skilled in the art that many changes and modifications can be made without departing from the scope of the invention as defined in the appended claims.

What is claimed is:

1. A wrapping paper supply device for a coin packing machine having a coin packing mechanism, comprising a rotary disc, a plurality of holders carried by said disc for supporting rolls of wrapping papers of different types corresponding to various types of coins to be packed, means at one side of each of the holders for feeding the wrapping paper to the coil packing mechanism, electrical means for automatically selecting one of the holders according to the selected type of the coins, said electrical means including a switch having stationary contacts for selecting the type of coins, and a plurality of switches each connected to the respective stationary contacts of said switch and actuated by rotation of said rotary disc, and motive power means for driving the rotary disc controlled by said switch and said plurality of switches.

2. The wrapping paper supply device as claimed in claim 1 in which said holders are uniformly spaced along the circumference of the disc and secured to one surface of the disc, and said means for feeding the wrapping paper including a plurality of pairs each of a driving roller and a pinch roller, each one of said pairs being associated with the respective one of said holders for feeding the wrapping paper, and a clutch mechanism interlocked with the packing mechanism for driving said driving roller when said selected one of said coins reaches the operating position.

3. The wrapping paper supply device as claimed in claim 1 in which said rotary disc is provided with an electrically operated locking device concurrently energized and deenergized by said motive power means.

4. The wrapping paper supply device as claimed in claim 3 in which said locking device is provided with a plurality of openings for each type of coin equally spaced along the circumference of said disc, and a locking bar selectively engageable with one of said openings.

5. The wrapping paper supply device as claimed in claim 3 in which said locking device includes a plurality of switch actuating means secured on one side surface of said disc of different radial distances from the axis of rotation thereof for opening and closing said plurality of switches on rotation of said rotary disc.

*6. A wrapping paper supply device for a coin packing machine having a coin packing mechanism, comprising, in combination, a plurality of holders, each holder being adapted to hold respective ones of the coils of wrapping papers of different types corresponding to various types of coins to be packed, a transfer means for transferring a coil of a wrapping paper corresponding to the coins to be wrapped to a wrapping paper feeding position adapted to feed the paper into the coin packing mechanism, said transfer means supporting said holders, means to select one of the coils of wrapping papers according to the selected types of the coins, and means to feed the wrapping paper of a selected coil transferred to the wrapper paper feeding position to the coin packing mechanism.*

*7. The wrapping paper supply device as claimed in claim 6 including a cutter at the position corresponding to each wrapping coil and serving to cut automatically the wrapping paper into a predetermined length upon wrapping of the stack of coins by the paper.*

*8. The wrapping paper supply device as claimed in claim 6 in which said transfer means includes a rotary disc, an electric motor driving the rotary disc, said motor being controlled by a rotary switch operated in accordance with the selection of the type of coins, and switch means operated by the rotation of the rotary switch.*

*9. The wrapping paper supply device as claimed in claim 8 in which the rotary disc carries the holders in*

*circumferentially spaced relation and a plurality of pairs of rollers, each consisting of a driving roller and a pinch roller, each one of said pairs being associated with a respective one of the holders to feed the wrapping paper carried thereby, and a clutch mechanism interlocked with the packing mechanism for driving the driving roller when said selected one of said coils reaches the wrapping paper feeding position.*

*10. The wrapping paper supply device as claimed in claim 8 in which said rotary disc is provided with an electrically operated locking device concurrently energized and deenergized by the electric motor.*

References Cited

The following references, cited by the Examiner, are of record in the patented file of this patent or the original patent.

UNITED STATES PATENTS

| | | | |
|---|---|---|---|
| 1,178,645 | 4/1916 | Johnson | 242—55.42 |
| 2,151,677 | 3/1939 | Baker | 242—55.42 |
| 3,029,571 | 4/1962 | Douthit | 53—168 X |

ROBERT L. SPRUILL, Primary Examiner

U.S. Cl. X.R.

53—168; 242—55.42